(12) United States Patent
Laenge

(10) Patent No.: US 6,530,691 B2
(45) Date of Patent: Mar. 11, 2003

(54) MOUNTING OF THE BOTTOM BEARING RING OF A ROTATING DECK OR A SUPERSTRUCTURE OF A CRANE ON A MAST

(75) Inventor: Walter Laenge, Ludesch (AT)

(73) Assignee: Liebherr-Werk Nenzing GmbH, Nenzing (AT)

(*) Notice: Subject to any disclaimer, the term of this patent is extended or adjusted under 35 U.S.C. 154(b) by 0 days.

(21) Appl. No.: 09/838,558

(22) Filed: Apr. 20, 2001

(65) Prior Publication Data
US 2002/0154841 A1 Oct. 24, 2002

(51) Int. Cl.[7] ............................. F16C 35/02; B66C 23/84
(52) U.S. Cl. ....................................... 384/295; 212/253
(58) Field of Search ................................ 384/276, 282, 384/295, 296, 297; 212/253

(56) References Cited

U.S. PATENT DOCUMENTS

| | | | |
|---|---|---|---|
| 4,061,230 A | * 12/1977 | Goss et al. | 212/253 |
| 4,184,600 A | * 1/1980 | Goss et al. | 384/297 |
| 4,354,606 A | * 10/1982 | Morrow et al. | 212/253 |
| 5,310,067 A | 5/1994 | Morrow | 212/253 |
| 5,487,478 A | * 1/1996 | Morrow | 212/253 |

* cited by examiner

Primary Examiner—Thomas R. Hannon
(74) Attorney, Agent, or Firm—Jacobson Holman PLLC

(57) ABSTRACT

A mounting of the bottom bearing ring of a rotating deck or a truck of a crane on a mast comprises bearing slides, which are spaced apart and connected to the inside of the bearing ring and which support the bearing bodies, which are made of a high quality sliding material and are braced against an annular peripheral surface of the mast. Each bearing slide comprises a steel plate with a flat rearside, whose entire area rests without tilting against a flat support surface of the bearing ring, and that the bearing slide is connected to the ring so as not to rotate or move.

20 Claims, 3 Drawing Sheets

MOUNTING OF THE BOTTOM BEARING RING OF A ROTATING DECK OR A SUPERSTRUCTURE OF A CRANE ON A MAST

BACKGROUND OF THE INVENTION

The invention relates to a mounting of the bottom bearing ring of a rotating deck or a superstructure of a crane on a mast. Said mounting comprises bearing slides, which are spaced apart and connected to the inside of the bearing ring and which support the bearing bodies, which are made of a high quality sliding material and are braced against an annular peripheral surface of the mast. Such mast-type cranes can be mounted on trucks, but are used preferably as offshore cranes. "In U.S. Pat. No. 5,310,067 such a pedestal crane having upperworks and boom means and a self-adjusting bearing means disposed between the upperworks and pedestal means is described. This known crane comprises means for removably securing the bearing means within that upperworks against vertical displacement, means for removably securing said bearing means against circumferential displacement, means for permitting within limits the automatic translation of that bearing means in a generally horizontal plane under load and means for permitting within limits the automatic angular rotation of said bearing means in a generally vertical plane under load, whereby the bearing means may automatically and controllably compensate for the angular misalignment between the longitudinal axis of said pedestal means and the axis of rotation of said upperworks and boom means." In this prior art the base plate of the rotating deck is provided with a circular cutout, hole, which is adapted to the diameter of the "central post", forming the "pedestal means", and whose periphery is provided with recesses, into which the "backing members", forming the bearing slides, are installed in a manner that they can move relative to the "base plate" in a horizontal plane and, in particular, can rotate about a horizontal axis, when a load, hanging on the "boom", "is exerted on the upperworks and the base plate".

However, such an ability to deform the "bearing means in relation to the base plate" is undesired for various reason. First of all, the radial displacement of the bearing slides in relation to the bearing ring of the rotating deck is a problem. This horizontal displacement of the bearings takes place when the load is affixed for the first time and thereafter never resets itself. This means that the position of the bearings remains constant, that is pushed back, in the radial direction, since there are no resetting forces after unloading. Thus, the entire mounting exhibits slack. In addition, the bearing slides, which are pushed back, do not become active again until correspondingly large forces act on the crane.

Secondly, the rotation of the bearing slides about the horizontal axis is a problem. According to the U.S. Pat. No. 5,310,067, the rotation about the said horizontal axis is accomplished by means of a deformation of the bearing slides. "Particularly, the rather thin retainer member is bent so as to permit the subassembly including the backing member and the wear material to rotate about its support about an axis perpendicular to the load direction." This rotation of the "retainer member" can lead to resilient deformations. In any case the service life is significantly reduced as a consequence of the increasing stress and the subsequent back and forth deformation of the bearing slides.

SUMMARY OF THE INVENTION

Therefore, the object of the invention is to provide a mounting of the prior art type that prevents the "bearing means" from sloping in relation to the bottom bearing ring of the rotating deck.

The invention solves this problem in that each bearing slide comprises a steel plate with a flat rearside, whose entire area rests without tilting against a flat support surface of the bearing ring, and that the bearing slide is connected to the ring so as not to rotate or move. In the inventive mounting, a flexible movement of the bearing slide in relation to the bottom bearing ring, supporting the rotating deck, is ruled out so that the "bearing means" remain undeformed even under load.

Of course, the bearing slides can be interchanged with the bearing bodies in order to prevent wear exceeding the allowable amount.

A preferred embodiment provides that the rearside of the plate is welded in the shape of a yoke to two pairs of brackets, which stand at right angles on said rearside and which enclose the faces of the ring. Furthermore, the brackets and the ring are provided with aligned boreholes, through which are guided the connecting screws. Owing to this type of screw connection of the plate with the bearing ring, said bearing ring cannot tilt when resting against the support surface of the bearing ring.

Another preferred embodiment provides that the rearside of the plate is welded in the area of the upper edge to two brackets, which stand vertically on said rearside. The plate is provided with ear-shaped continuations, which project beyond the bottom edge. Angular pieces are screwed to the continuations; and the brackets and the upper legs of the angular pieces envelop the faces of the bearing ring. The connecting screws are guided through the aligned boreholes of the brackets, the bearing ring and the upper legs of the angular pieces. This embodiment of the invention permits the rotating deck of the crane to be put, first of all, without the bearing slides on the mast and to insert the bearing slides from the top between the mast and the bearing ring at a later point in time. With the bearing slides removed and the corresponding existing slack, it is much easier, or optionally it permits now, the rotating deck to be mounted on the mast. Similarly there is also the option of disassembling again the bearing slides later.

Another embodiment provides that the plates are provided on the edges, projecting beyond the side continuations or the faces of the bearing rings, with boreholes, which align with the boreholes of the bases, fastened to the faces of the bearing ring, and that connecting screws are guided through the aligned boreholes. These connecting screws can be continuous tightening screws. The boreholes in the bases, welded to the bearing ring, can also be threaded boreholes, into which the connecting screws are then screwed.

The plates can be recessed into recesses of the bearing ring that correspond to the length of said plates so that said plates are fixed in position in the recesses so that they cannot rotate in the circumferential direction.

The narrow sides of the plates can be provided with yoke-like continuations, which engage with the approximately radial, step-shaped sides of the recesses and form additional protection against tilting and axial displacement.

Only the upper regions of the narrow sides of the plates can also be provided with a continuation, which engages with the step-shaped sides and which permits then, after disconnecting the screws, the plates to be pulled out in the direction of the top or, in particular, permits the bearing slides to be inserted later from the top.

The front sides of the plates are provided with retaining members for the purpose of fastening the bearing bodies.

In a further development of the invention the bearing slides and the bearing ring are designed in such a manner that the force is always introduced over the support surface of the bearing ring, thus without generating in essence any moments. The axial projecting length of the bearing body, made of a sliding material, in the longitudinal direction of the mast beyond the support surface of the bearing ring is very small. Thus, radial forces, acting on the upper and bottom edges of the bearing bodies, cannot exert any large tilt moments. The entire area of the bearing slides is braced and the forces are passed uniformly into the bearing ring. Preferably the bearing body in the axial direction is at a maximum one third thicker than the bearing ring.

Even with the use of soft sliding material for the bearing bodies, the wear and friction on the opposing surfaces cannot be avoided. In order not to weaken the mast, there is preferably a ring, which is welded on the mast and is subject to the action of the bearing slides. Thus, even if the bearing bodies grind in or cause wear of the counter-surface, the material of the mast remains unaffected. Notch effects or a weakening of the mast cannot occur, since the material of the mast itself does not form the sliding surface for the bearing slides.

Since the mounting of the bearing slides on the bearing ring cannot be displaced, rotated or tilted, it is possible for the bearing bodies, made of sliding material, to wear non-uniformly. However, they are parts subject to wear and hence are readily interchangeable. However, the significant advantage of the inventive mounting lies in the fact that there are no problems associated with the service life. The bearing slides are no longer subject to alternating bending, which leads to premature fatigue. In addition, a weakening of the mast is ruled out. Finally there is no bearing slack due to the remaining deformation of the mounting.

BRIEF DESCRIPTION OF THE DRAWINGS

Embodiments of the invention are explained in detail below with reference to the drawings.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 5:
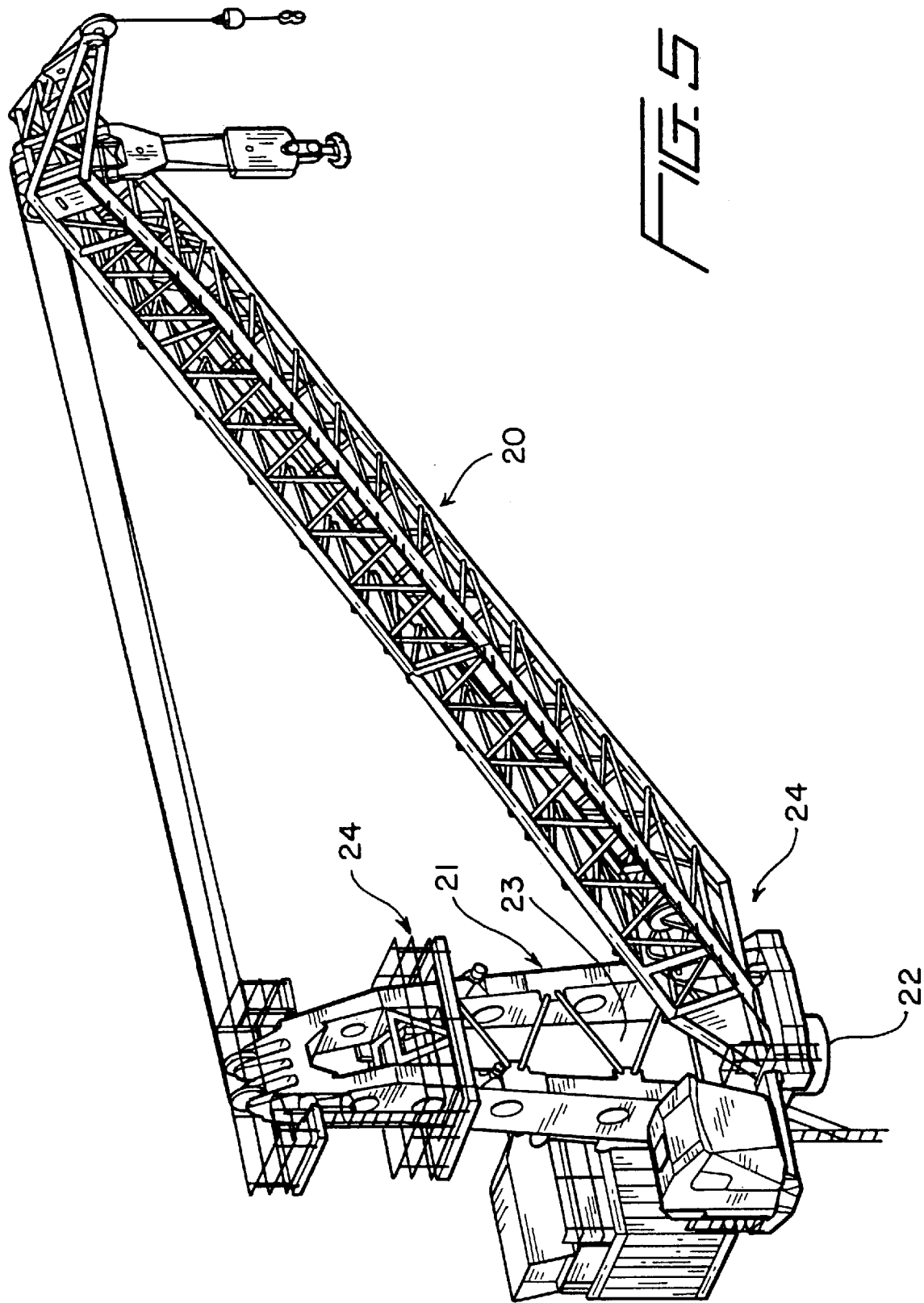
FIG. 5 is a perspective overview of an offshore crane of the "king post" type.

FIG. 5 depicts an offshore crane of the "king post type". "The crane includes a boom 20 which is affixed to the superstructure 21 with respect to which the boom 20 is free to rotate about a horizontal axis 22. A king post 23 may be rigidly mounted to the pedestal of an offshore platform. The said superstructure 21 is supported by the said king post 23 for rotation about a vertical axis. More particularly, the superstructure is connected to the said king post by means of a lower bearing 24 positioned at a base portion of the king post, and an upper bearing 25 positioned at a tip portion of the said king post."

"At its lower end portion superstructure 21 includes a bearing ring 1, which rotates with such superstructure and supports bearings radially effective."

Figure 1:
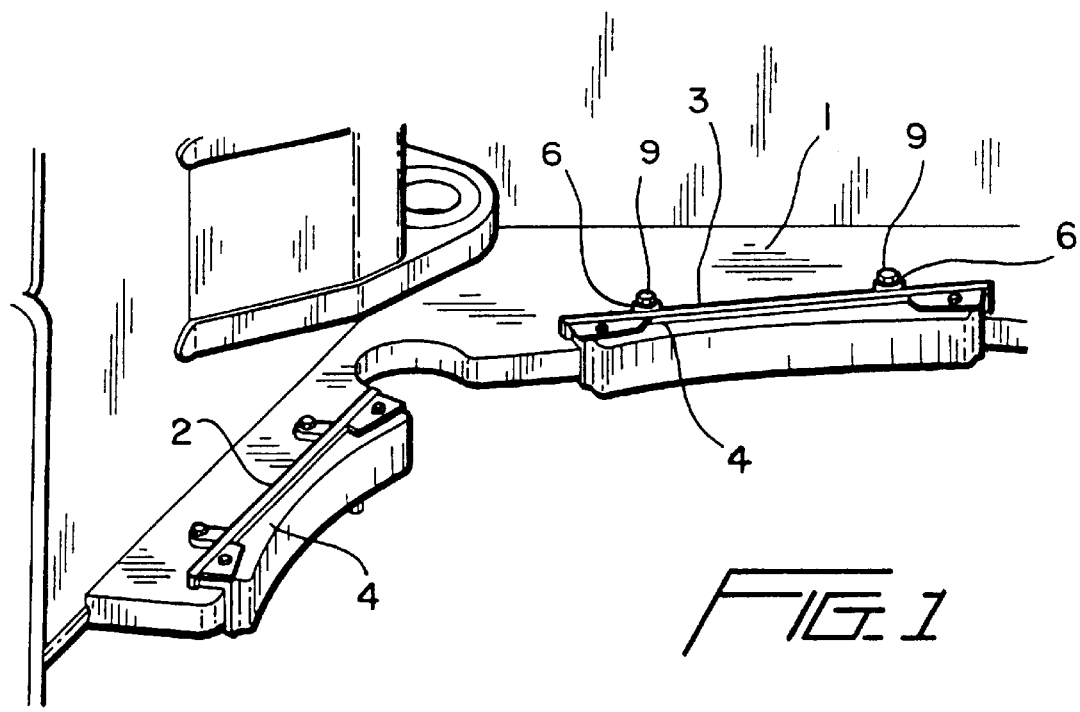
FIG. 1 depicts a peripheral segment of a bearing ring, mounting a rotating deck or a superstructure in the bottom region, and a perspective view of the bearing slides, held on the inside edge of said bearing ring.
Figure 2:
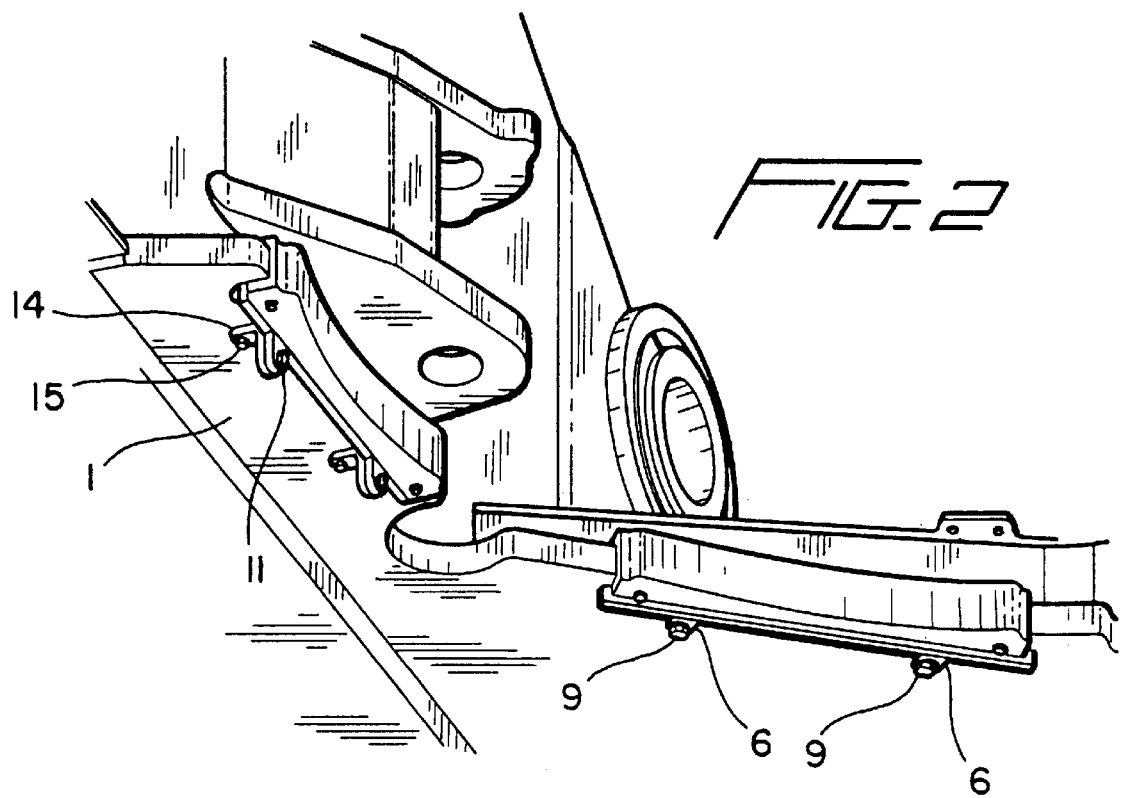
FIG. 2 is a view of the mounting, according to FIG. 1, at right angles from the bottom.

FIG. 1 depicts a peripheral segment of the bearing ring 1, which is fastened to the rotating deck or superstructure and forms the bottom mounting of the rotating deck at a mast or king post (not illustrated).

Spaced apart in recesses of the bearing ring 1, the bearing slides 2, 3 are secured in the recesses of the bearing ring so as not to move or tilt. Said bearing slides support bearing bodies 4, which are made of suitable plastic, for example polyamide or bearing metal, for example bronze, and whose side, facing the mast, is provided with circular surfaces, which are concentric to the central axis of the mast.

Figure 3:
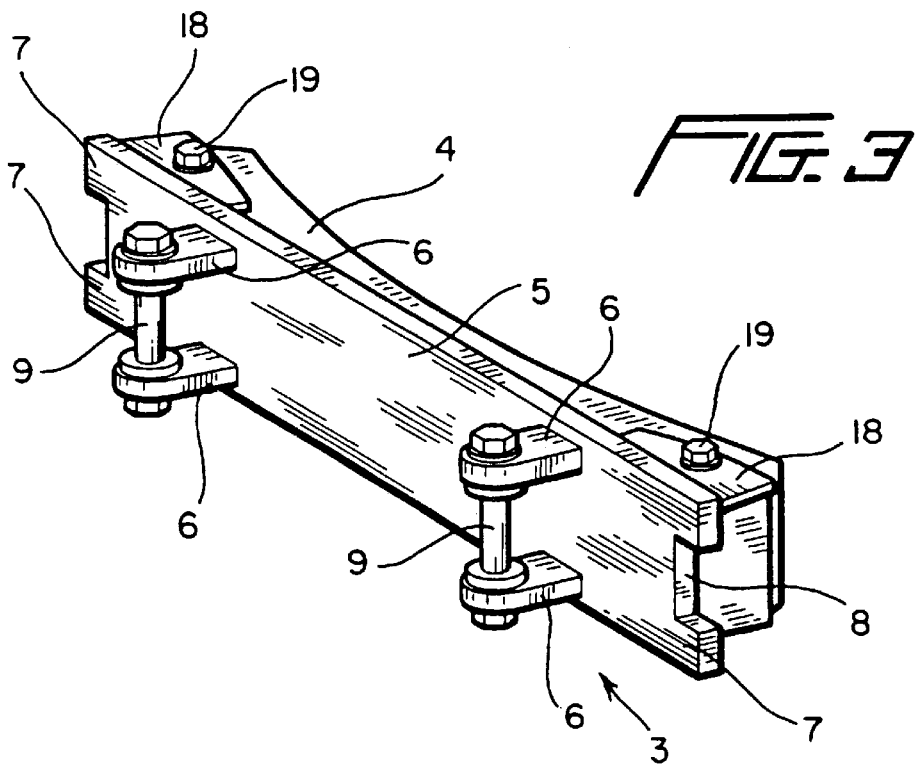
FIG. 3 is a perspective view of one embodiment of the bearing slide.

The bearing slide 3, depicted in FIG. 3, comprises an essentially rectangular plate 5, which exhibits a flat rearside. Brackets 6, whose spacing is equal to the thickness of the bearing ring 1, are welded to the rearside of the plate. The brackets 6 exhibit aligned boreholes, which are aligned with the boreholes of the bearing ring 1. The bearing slides 5 are inserted in such a manner into the recesses of the bearing ring that the rearsides of the plates 5 rest without tilting against the surfaces, which form the base of the recesses. The narrow faces of the plates 5 are provided with rectangular recesses, so that the projections 7, defining the recesses, engage with the right angled, side steps of the recesses of the bearing ring. With the base surfaces 8, the plates 5 can rest against the side steps of the recesses. The screws 9 penetrate the boreholes of the brackets 6 and the boreholes of the bearing ring 1 that are in alignment with the said former boreholes so that the bearing slide 5 is connected rigidly to the bearing ring 1. That is, said bearing slide is blocked from displacement, rotation and/or tilt.

Figure 4:
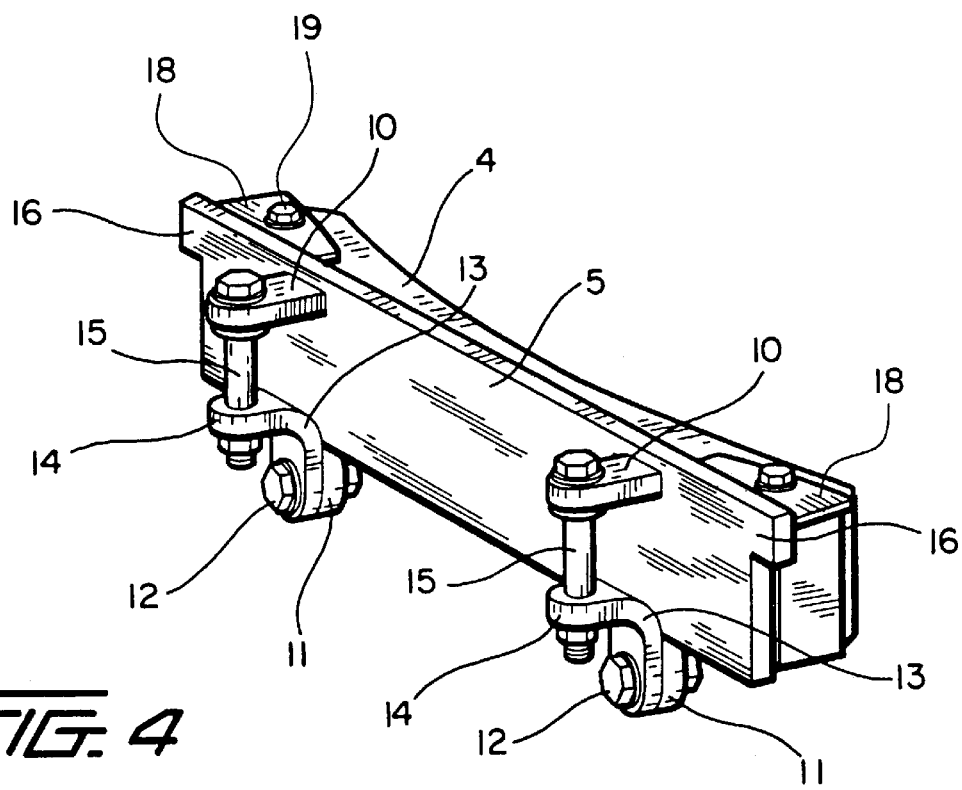
FIG. 4 is a perspective view of another embodiment of a bearing slide.

In the embodiment according to FIG. 4, only the upper side areas of the rearside of the plate 5 are welded with the brackets 10. The bottom long side edge of the plate 5 is provided with ear-shaped continuations 11. Angular pieces 13 are screwed to the ear-shaped continuations 11 by means of screws 12. The upper legs of said angular pieces are provided with boreholes that align with the boreholes of the brackets 10. The boreholes of the upper legs of the angular pieces 13 and the brackets 10 align with the boreholes of the bearing ring 1. The screws 15 are guided through the aligned boreholes so that the plates 5, forming the bearing slides, are fixed in the recesses of the bearing ring 1 so as not to move or tilt. The plates 5 project beyond the side steps of the recesses of the bearing ring 1 only with the upper continuations 16, so that, following disassembly of at least one screw connection of the angular pieces 13, the bearing slides can be pulled out toward the top.

On the front side the plates, forming the bearing slides, are welded to the brackets 18, which are provided with aligned boreholes, which are aligned with the boreholes of the bearing bodies 4, so that the bearing bodies 4 are screwed together with the bearing slides 5 by means of the screws 19.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

What is claimed is:

1. A mount for a bottom bearing ring of a rotating deck or a superstructure of a crane supporting a mast or king post comprising:

a plurality of bearing slides spaced apart and fixedly connected to a flat support surface of said bearing ring, each of said bearing slides including a steel plate with a flat rearside that rests along a longitudinal length thereof without tilting against said flat support surface;

a plurality of bearing bodies supported on said plurality of bearing slides, respectively, said plurality of bearing bodies for contacting and bracing an annular peripheral surface of the mast or king post.

2. The mount as set forth in claim 1, wherein an axial thickness of said flat support surface against which said bearing slides rest is at least half of an axial length of said bearing slides fastened thereto.

3. The mount as set forth in claim 2, wherein the axial thickness of said flat support surface is more than two-thirds the axial length of said bearing slides.

4. The mount as set forth in claim 1, wherein the flat rearside of said plate is welded to a pair of brackets that extend substantially perpendicular to said rearside, said bearing ring fitting between said brackets and connected thereto by fastening elements extending through aligned boreholes in said brackets and said bearing ring.

5. The mount as set forth in claim 1, wherein the flat rearside of said plate is welded adjacent an upper edge thereof to a bracket that extends substantially perpendicular to said rearside, a lower edge of said plate including an ear-shaped continuation that projects beyond said lower edge, and further comprising an angular piece having a lower leg connected to said continuation and an upper leg substantially vertically aligned with said bracket, said bearing ring fitting between said bracket and said upper leg and connected thereto by fastening elements extending through aligned boreholes in said bracket, said upper leg of said angular piece and said bearing ring.

6. The mount as set forth in claim 5, wherein said continuation includes boreholes that align with boreholes in said lower leg of said angular piece through which fastening elements extend to secure said lower leg to said continuation.

7. The mount as set forth in claim 1, wherein said plates fit within recesses in said bearing ring, said longitudinal length of said plates corresponding to a length of said recesses.

8. The mount as set forth in claim 7, wherein each side edge of said plate includes upper and lower projections that engage with upper and lower surfaces, respectively, of step-shaped side edges of said recesses.

9. The mount as set forth in claim 7, wherein each side edge of said plate includes an upper projection that engages with an upper surface of a respective step-shaped side edge of said recess.

10. The mount as set forth in claim 1, wherein said plate includes a bracket on a front side thereof, said bracket having boreholes that align with boreholes in a respective one of said plurality of bearing bodies through which a fastening element extends to secure said bearing body to said plate.

11. A mount for a bottom bearing ring of a rotating deck or a superstructure of a crane supporting a mast or king post, said bearing ring having an annular inner perimeter with spaced generally rectangular recesses therein, which comprises a plurality of bearing slides inserted within said generally rectangular recesses of said bearing ring, respectively, each of said bearing slides including a steel plate with a flat rearside abutting a flat support surface of a respective recess and fixedly connected to said bearing ring; and a plurality of bearing bodies supported on said plurality of bearing slides, respectively, said plurality of bearing bodies for contacting and bracing an annular peripheral surface of the mast or king post.

12. The mount as set forth in claim 11, wherein an axial thickness of said flat support surface against which said bearing slides rest is at least half of an axial length of said bearing slides fastened thereto.

13. The mount as set forth in claim 12, wherein the axial thickness of said flat support surface is more than two thirds the axial length of said bearing slides.

14. The mount as set forth in claim 11, wherein the flat rearside of said plate is welded to a pair of brackets that extend substantially perpendicular to said rearside, said bearing ring fitting between said brackets and connected thereto by fastening elements extending through aligned boreholes in said brackets and said bearing ring.

15. The mount as set forth in claim 11, wherein the flat rearside of said plate is welded adjacent an upper edge thereof to a bracket that extends substantially perpendicular to said rearside, a lower edge of said plate including an ear-shaped continuation that projects beyond said lower edge, and further comprising an angular piece having a lower leg connected to said continuation and an upper leg substantially vertically aligned with said bracket, said bearing ring fitting between said bracket and said upper leg and connected thereto by fastening elements extending through aligned boreholes in said bracket, said upper leg of said angular piece and said bearing ring.

16. The mount as set forth in claim 15, wherein said continuation includes boreholes that align with boreholes in said lower leg of said angular piece through which fastening elements extend to secure said lower leg to said continuation.

17. The mount as set forth in claim 11, wherein a longitudinal length of said plates corresponds to a length of said recesses.

18. The mount as set forth in claim 17, wherein each side edge of said plate includes upper and lower projections that engage with upper and lower surfaces, respectively, of step-shaped side edges of said recesses.

19. The mount as set forth in claim 17, wherein each side edge of said plate includes an upper projection that engages with an upper surface of a respective step-shaped side edge of said recess.

20. The mount as set forth in claim 11, wherein said plate includes a bracket on a front side thereof, said bracket having boreholes that align with boreholes in a respective one of said plurality of bearing bodies through which a fastening element extends to secure said bearing body to said plate.

* * * * *